United States Patent
Davies (10) Patent No.: US 12,552,547 B2
(45) Date of Patent: Feb. 17, 2026

(54) HIGH LIFT SKEW SYSTEM

(71) Applicant: GOODRICH ACTUATION SYSTEMS LIMITED, Solihull (GB)

(72) Inventor: Stephen Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 347 days.

(21) Appl. No.: 18/315,768

(22) Filed: May 11, 2023

(65) Prior Publication Data

US 2023/0382556 A1 Nov. 30, 2023

(30) Foreign Application Priority Data

May 25, 2022 (EP) .................................... 22275067

(51) Int. Cl.
*B64D 45/00* (2006.01)
*G01D 5/02* (2006.01)

(52) U.S. Cl.
CPC .... *B64D 45/0005* (2013.01); *B64D 2045/001* (2013.01); *G01D 5/02* (2013.01)

(58) Field of Classification Search
CPC ............ B64D 45/00; B64D 2045/0085; B64D 45/0005; B64D 2045/001; G01M 17/00; G01M 5/0016; G01M 99/008; G01D 5/00; G01D 5/02
See application file for complete search history.

(56) References Cited

U.S. PATENT DOCUMENTS

| | | | |
|---|---|---|---|
| 5,686,907 A | 11/1997 | Bedell et al. | |
| 6,466,141 B1 * | 10/2002 | Mckay | B64C 13/00 340/963 |
| 8,115,649 B2 | 2/2012 | Moy et al. | |
| 9,199,743 B2 | 12/2015 | Thomas | |
| 9,616,990 B2 | 4/2017 | Barger | |
| 2010/0064823 A1 | 3/2010 | Schlegel et al. | |
| 2010/0277346 A1 | 11/2010 | Moy et al. | |
| 2013/0068893 A1 * | 3/2013 | Thomas | B64D 45/0005 244/194 |

(Continued)

FOREIGN PATENT DOCUMENTS

| | | | | |
|---|---|---|---|---|
| EP | 0726201 A1 | 8/1996 | | |
| EP | 2695810 A1 * | 2/2014 | | B64C 13/34 |

(Continued)

OTHER PUBLICATIONS

European Search Report for Application No. 22275067.1, mailed Oct. 21, 2022, 8 pages.

*Primary Examiner* — Benjamin R Schmitt
(74) *Attorney, Agent, or Firm* — CANTOR COLBURN LLP (57) ABSTRACT

A skew sensing apparatus for detecting skew in at least one, or a plurality of control surfaces of a vehicle. The apparatus includes a tension cord which is held under tension between a) a first spring associated with a sensor and a sensor target and b) an opposing second spring. During normal operation, the apparatus is configured to maintain said sensor target in a first position relative to said sensor, thereby indicating said normal operation. During an abnormal operation, the apparatus is configured to shunt said tension cord such that said sensor target is translated to a second position, relative to said sensor thereby indicating said abnormal status.

11 Claims, 8 Drawing Sheets

(56) References Cited

U.S. PATENT DOCUMENTS

2019/0359313 A1 11/2019 Bensmann
2021/0261269 A1 8/2021 Thomas

FOREIGN PATENT DOCUMENTS

| WO | 2011124904 | A2 | 10/2011 |
| WO | 2011124904 | A3 | 10/2011 |
| WO | 2019239103 | A1 | 12/2019 |

* cited by examiner

HIGH LIFT SKEW SYSTEM

CROSS-REFERENCE TO RELATED APPLICATIONS

This application claims priority to European Patent Application No. 22275067.1 filed May 25, 2022, the entire contents of which is incorporated herein by reference.

TECHNICAL FIELD

The devices and methods described herein relate to systems for detecting skew in a high lift system of an aircraft.

BACKGROUND

An aircraft may have many types of flight control surfaces including ailerons, elevators, rudders, spoilers, flaps, slats, airbrakes, and/or other suitable control surfaces. These flight control surfaces are used to maneuverer and control the altitude of an aircraft.

For example, multiple slats may be located on the leading edges of wings on a fixed-wing aircraft and enable a wing to operate at a higher angle of attack when the slats are deployed as compared to when they are not deployed or used. The slats are typically driven between an extended and a retracted position using an actuator system. The movement of the slats is typically performed such that the slats are aligned along an axis.

A situation such as a jam, or disconnect, may cause one or more of the slats to fail to move in a manner that maintains alignment along an axis with the other slats. This misalignment in the slats is referred to as skew and the amount of skew that is present can affect the aerodynamics of the aircraft.

Skew detection systems are therefore used on aircraft to detect skew in slats such that alerts may be generated and/or actions can be taken in case an undesired amount of skew occurs.

US 2010/0277346 describes a system for detecting skew of slats on the wing of an aircraft. For each surface the skew architecture requires four sensor tracks and 4 sensors. Thus, for an A220 aircraft, for example, the system requires 32 tracks and 32 sensors.

A need therefore exists for a skew detection system that is less complex and costly.

SUMMARY

A skew sensing apparatus for detecting skew in at least one, or a plurality of control surfaces of a vehicle is described herein; comprising a tension cord which is held under tension between a) a first spring associated with a sensor and a sensor target and b) an opposing second spring. During normal operation, said apparatus is configured to maintain said sensor target in a first position relative to said sensor, thereby indicating said normal operation, and wherein, in an abnormal operation, said apparatus is configured to shunt said tension cord such that said sensor target is translated to a second position, relative to said sensor thereby indicating said abnormal status.

In any of the examples described herein, in said abnormal status, said second spring may be configured to axially shunt said tension cord in the direction of said first sensor.

In any of the examples described herein, said abnormal status means that the cord is snapped or skewed.

In any of the examples described herein, the apparatus may comprise a Skew Sensor Unit, said skew sensor unit comprising said first spring, said sensor and said sensor target.

In any of the examples described herein, the apparatus may further comprise a Cord Tension Unit comprising said second spring.

In any of the examples described herein, the apparatus may be configured to be attached to said at least one or plurality of control surfaces via a first actuator, provided at a first end and a second actuator, provided at the opposite end.

In any of the examples described herein, the first spring may provide a lower opposing force to said second spring.

In any of the examples described herein, the apparatus may further comprise a Rotary Differential Shunt Actuator for each of said at a least one or plurality of control surfaces being monitored.

In any of the examples described herein, said Rotary Differential Shunt Actuator may comprise a spring loaded Ball Ramp Device, a Lost Axial Motion Device, a Ball Ramp Preload Spring, Two Rotary Inputs Shafts, each connected to two Rotary Pick Offs, each of which communicates with racks at each end of the control surface being monitored.

In any of the examples described herein, in normal operation, the Rotary Inputs Shafts may rotate in unison, without any differential rotation and the Ball Ramp Device may remain in a preloaded condition.

In any of the examples described herein, in an abnormal condition, a differential rotation between the Rotary Input Shafts may be configured to activate the Ball Ramp device against the Preload Spring such that said activated Ball Ramp device induces an axial shunt to the tension cord and translates the cord and Sensor Target to said second position relative to the Sensor.

In any of the examples described herein, said cord may be flexible.

In any of the examples described herein, said vehicle may be an aircraft.

In any of the examples described herein, said cord may extend across a plurality of said control surfaces.

DETAILED DESCRIPTION

The examples described herein relate to control surfaces of an aircraft, however, this apparatus could also be used to detect skew of control surfaces present in other vehicles. For an aircraft the control surfaces 1 may be provided at the leading edge or trailing edge of the aircraft wing.

Figure 1A:
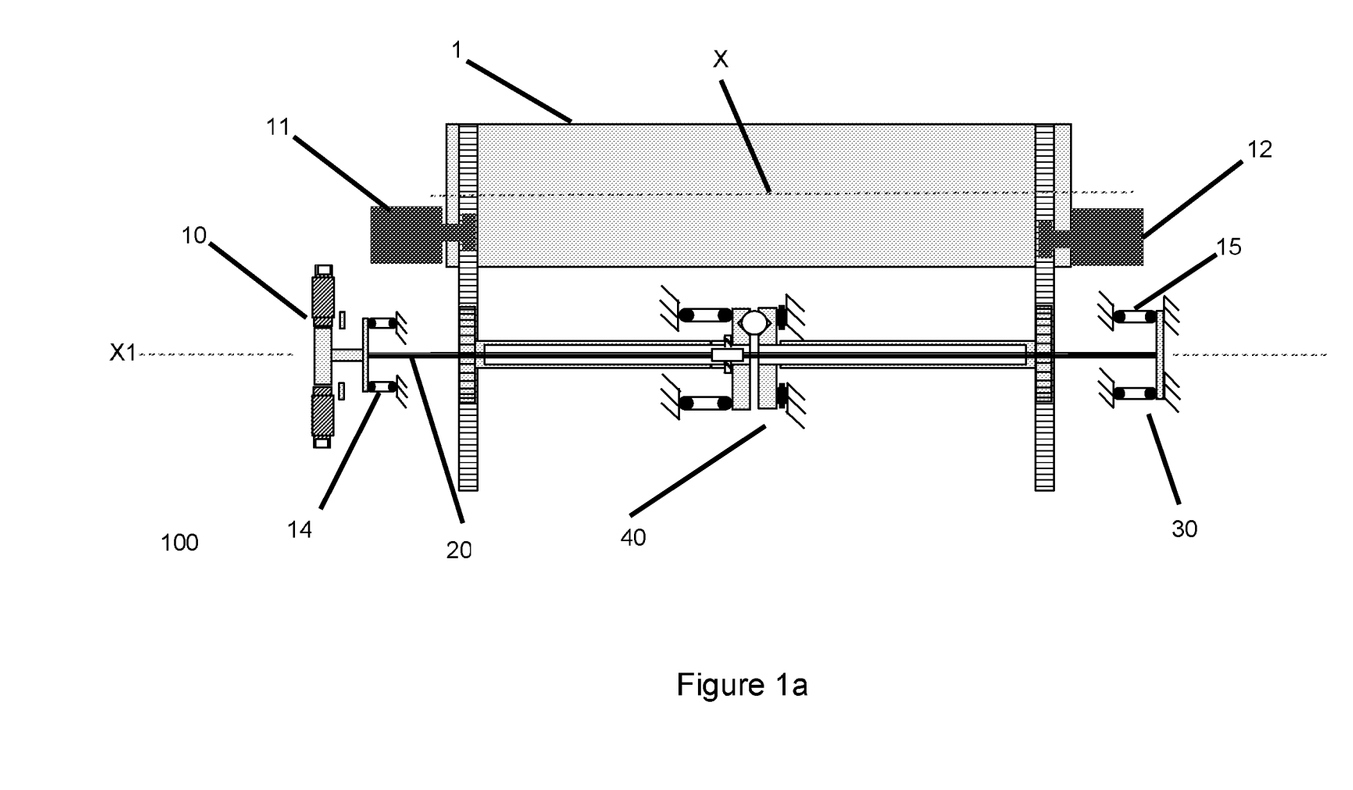
FIG. 1a depicts an overall skew detection apparatus with a control surface in normal operation.

FIG. 1a depicts a new type of overall skew sensing apparatus 100 for detecting skew in at least one, or a plurality of control surfaces 1 of a vehicle. Apparatus 100 comprises a Skew Sensor Unit 10, a Tension Cord 20, a Cord Tension Unit 30, and one Rotary Differential Shunt Actuator 40 for each surface being monitored for skew.

In FIG. 1a, the control surface 10 is attached to the aircraft wing via a first actuator 11, provided at a first end and a second actuator 12, provided at the opposite end. These actuators 11, 12 are used to drive the control surface 1 between an extended and a retracted position and typically via a rack and pinion arrangement with the pinion being part of the actuator and the rack being part of the control surface. When multiple control surfaces 1 are provided on an aircraft wing, the movement of the control surface 1 is typically performed such that the control surfaces are all aligned along an axis X.

During use, if one of these actuators 11, 12 becomes disconnected or jammed, the position of the control surface 1 can become skewed and the position of the control surface 1 becomes misaligned relative to the axis X. It is important for this skew to be detected, as if both actuators of a control surface become dislodged during flight, the control surface 1 could detach from the aircraft wing surface and hazard the aircraft. The apparatus described herein provides a means of detecting this skew. The apparatus 100 also provides a means of detecting the complete snap of the line extending across the control surface. This will now be described in more detail.

Figure 1B:
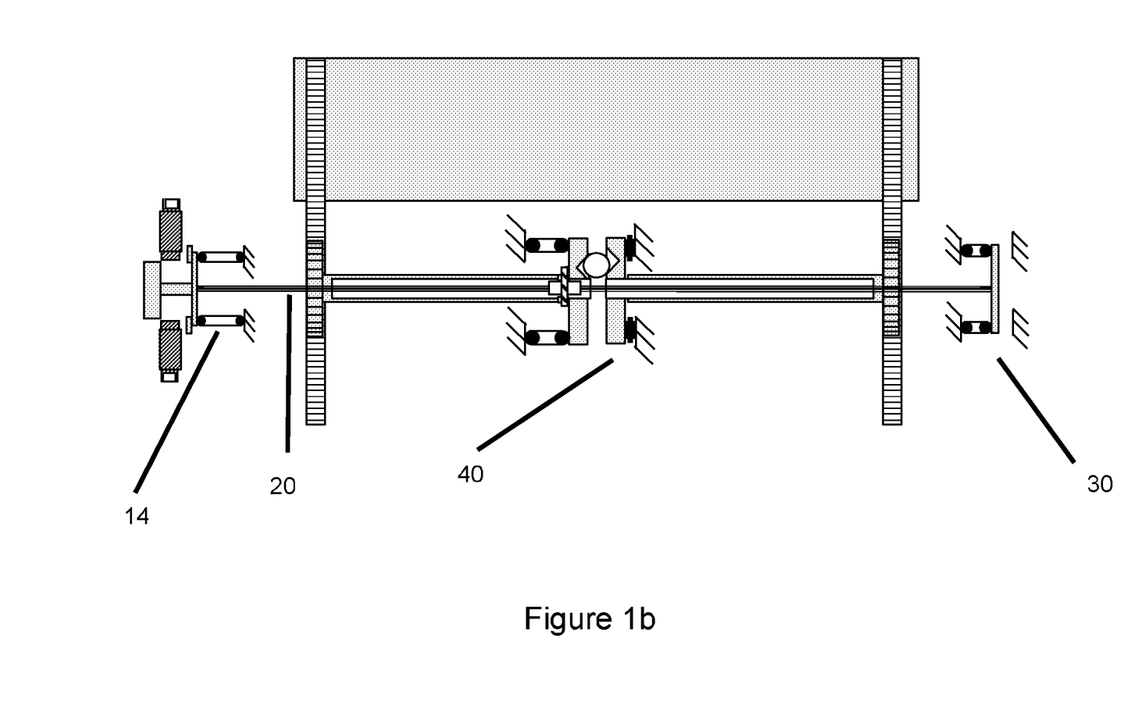
FIG. 1b depicts the skew detection apparatus of FIG. 1 with a control surface in a skew condition.
Figure 1C:
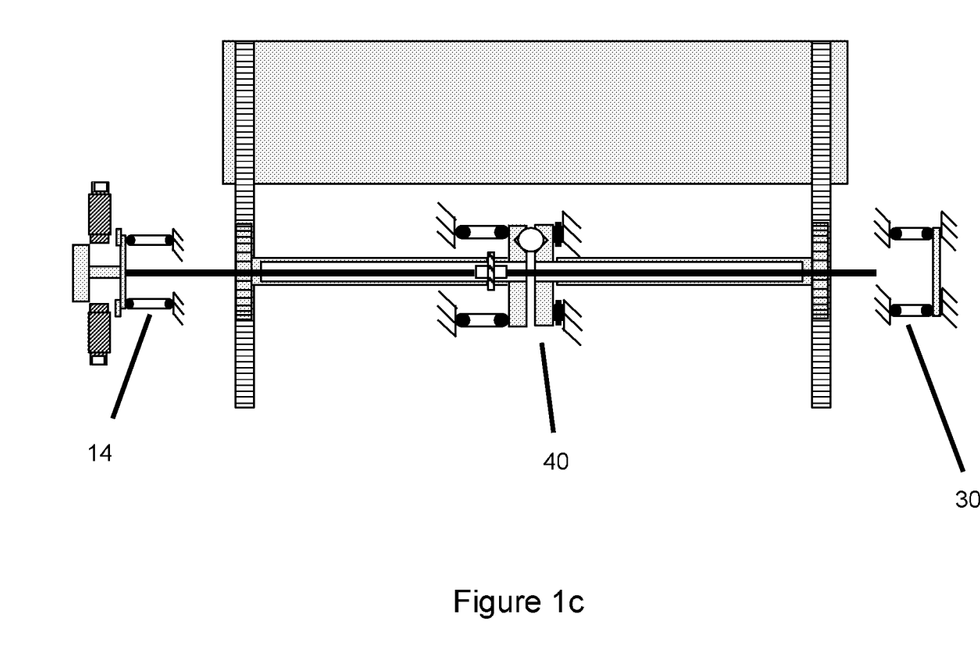
FIG. 1c depicts the skew detection apparatus of FIG. 1 with a control surface in normal operation and with a failed tension cord.

FIGS. 1a, b and c depict this new type of skew detection apparatus 100 in three stages of function. 1a depicts the apparatus in normal operation. 1b depicts the apparatus 100 when skew of the control surface 1 has occurred. 1c depicts the apparatus 100 when the tension line, or cord 20 has failed by snapping.

The tension line, or cord 20 is a flexible line that can be held under tension. In use, the line 13 is held under tension via the use of two opposing tension springs 14, 15: a first Actuation Spring 14 provided as part of the Skew Sensor Unit 10 at the first end of the line 20, and a second, Tension Spring 15, provided as part of the Cord Tension Unit 30 at the second, opposite, end of the line 20.

The tension spring 15 provides a higher tensile force on the line 20 along an axis X1 parallel to the axis X and maintains the line 20 at a reference position along that axis X1. The Actuation spring 14 provides a lower opposing force to tension spring 15. These two springs working in this way therefore maintain the line 20 under constant tension unless the cord 20 snaps.

Figure 2A:
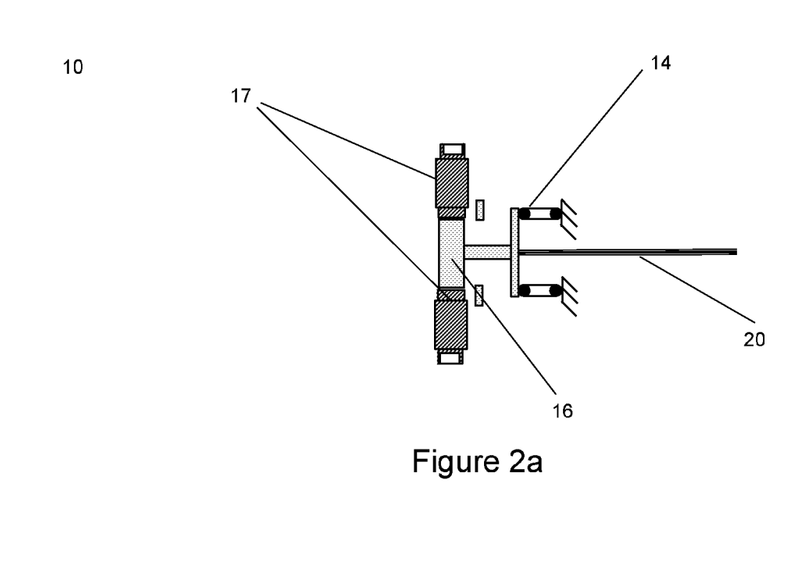
FIG. 2a depicts the Skew Sensor Unit.

The Skew Sensor Unit 10 is depicted in more detail in FIG. 2 and comprises the Actuation Spring 14, a Sensor Target 16 and a number of Sensors 17. The number of sensors 17 employed will be determined by vehicle/aircraft requirements but will typically be two in order to provide indication status to two independent control channels.

Figure 3:
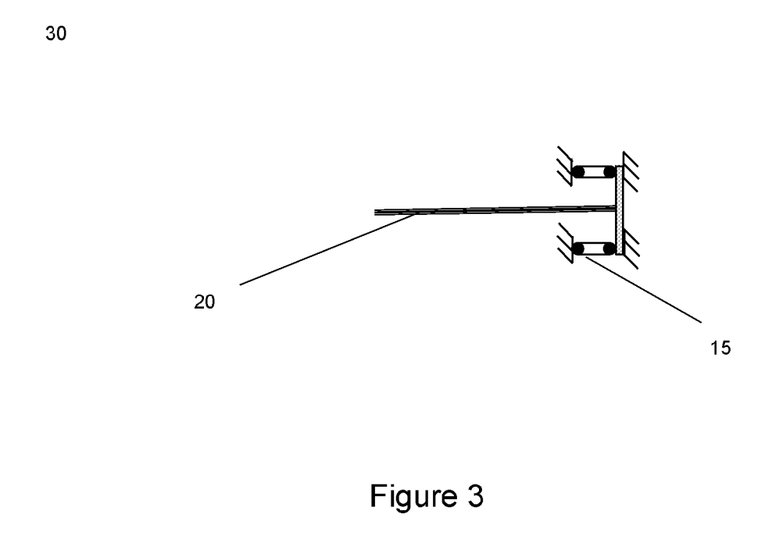
FIG. 3 depicts the Cord Tension Unit.

A Cord Tension Unit 30 is depicted in more detail in FIG. 3 and comprises a cord Setting Spring 15 that positions the Tension Cord 20 at a reference position in axis X1. The force provided by the Setting Spring 31 exceeds the force provided by the Actuation Spring 14 in the Skew Sensor Unit 10.

The Skew Sensor Unit 10 has two status conditions; either normal (operational, i.e. no skew) status (as shown in FIG. 1b) or abnormal (fault) status (as shown in FIGS. 1b and 1c).

Figure 2B:
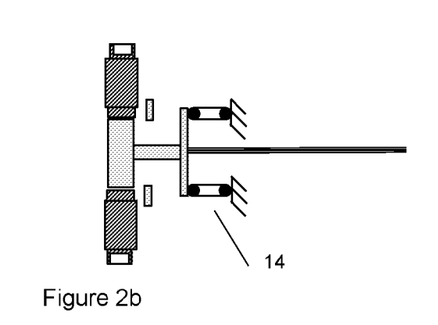
FIG. 2b depicts the skew sensor unit in normal operation.
Figure 2C:
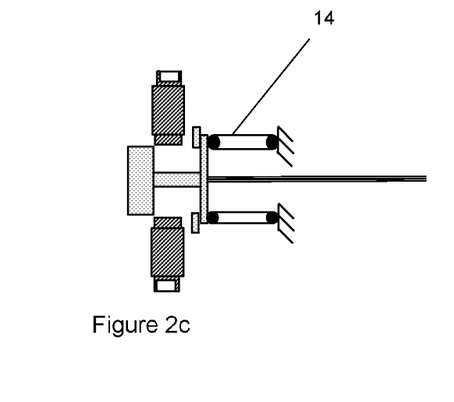
FIG. 2c depicts the skew sensor unit in a skew or failure condition.

During normal operation, such as is depicted in FIG. 1a, the Cord Tension Unit 30 maintains the Sensor Target 16 within the Skew Sensor Unit 10, in the position relative to the Sensors 17 that results in a normal status to be indicated. This is depicted in FIG. 2b.

In any abnormal event (such as is depicted in FIGS. 1b and 1c) in which the Tension Cord 20 is axially shunted towards the Skew Senor Unit 10, the Actuation Spring 15 translates the Sensor Target 16 to a second position relative to the Sensors 17 that reports abnormal status.

If the line 20 fails, for example, if it snaps or skews, then the Actuation Spring 14 within the Skew Sensor Unit 10 will push the Sensor Target 16 to a second position relative to the Sensors 17 which results in abnormal (fault) status being reported. Failure of the tension line is therefore detectable. This is shown in FIG. 1c.

Figure 4A:
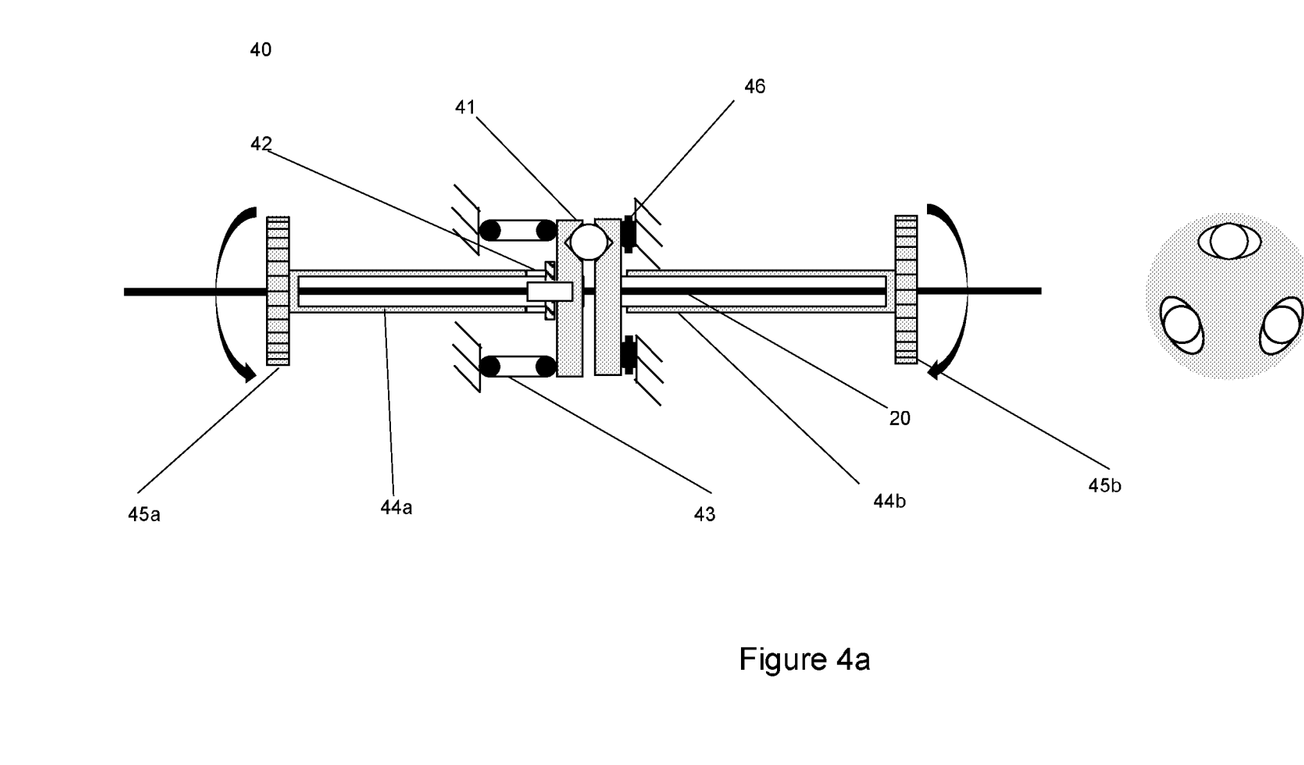
FIG. 4a depicts the Rotary Differential Shunt Actuator.
Figure 4B:
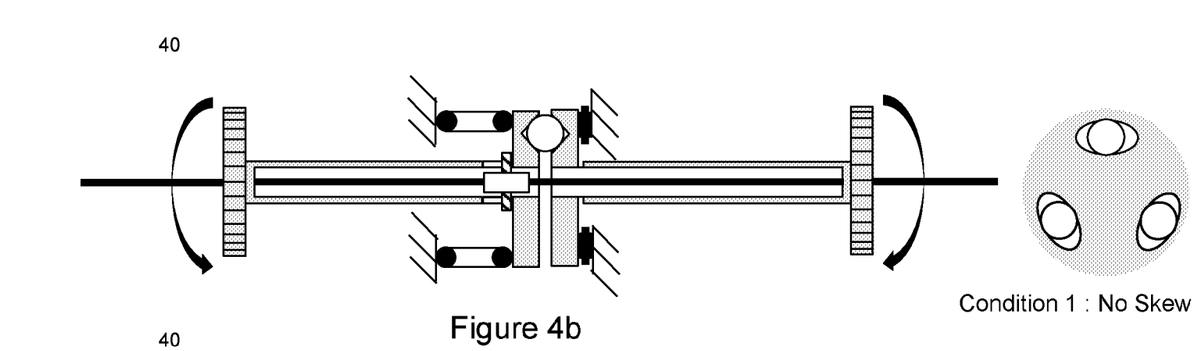
FIG. 4b depicts the Rotary Differential Shunt Actuator in normal (operational—no skew).
Figure 4C:
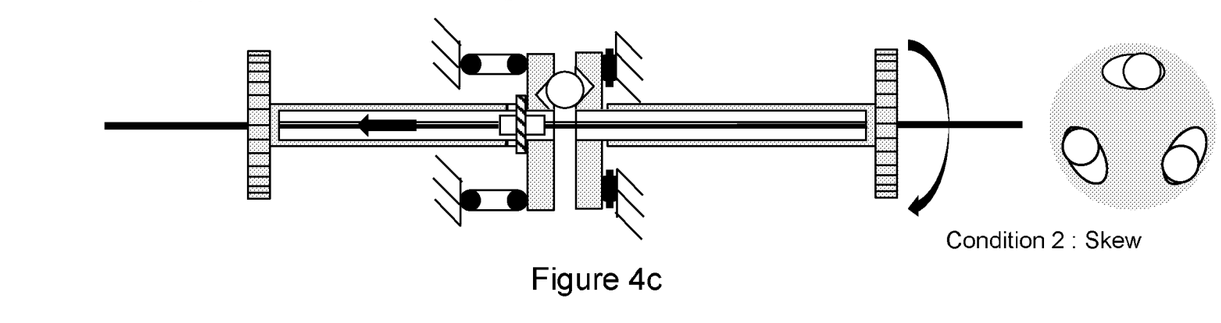
FIG. 4c depicts the Rotary Differential Shunt Actuator in abnormal (fault—skew) conditions.

A Rotary Differential Shunt Actuator 40 is also provided for each control surface 1 to be monitored by Apparatus 100 and is depicted in FIGS. 4a to 4c. A Rotary Differential Shunt Actuator 40 comprises a spring loaded Ball Ramp Device 41, having a bearing 46, a Lost Axial Motion Device 42, a Ball Ramp Preload Spring 43, Two Rotary Inputs Shafts, 44a, 44b, each connected to two Rotary Pick Offs 45a, 45b, each of which communicates with racks at each end of the control surface 1.

In normal operation, without skew (FIG. 4b), the Rotary Inputs Shafts 44a, 44b rotate in unison, without any differential rotation and the Ball Ramp Device 41 remains in a preloaded condition.

In the event of skew (FIG. 4c), a differential rotation between the Rotary Input Shafts 44a, 44b will serve to activate the Ball Ramp device 41 against the Preload Spring 43. The activated Ball Ramp device 41 induces an axial shunt to the tension cord 20 along the X1 axis which translates the cord 20 against the preload of the Cord Tension Unit 30 and enables the Actuation Spring 14 within the Skew Sensor Unit 10 to translate the Sensor Target 16 to a second position relative to the Sensors 17 to record an abnormal status.

The Ball Ramp Device 41 is bi-directional and can therefore detect any permutation of differential rotation between the Rotary Inputs Shafts 44a, 44b, for example if the first Actuator 11 jams or if the second Actuator 12 jams, and if skew occurs during extension or retraction of the surface 1.

Figure 5:
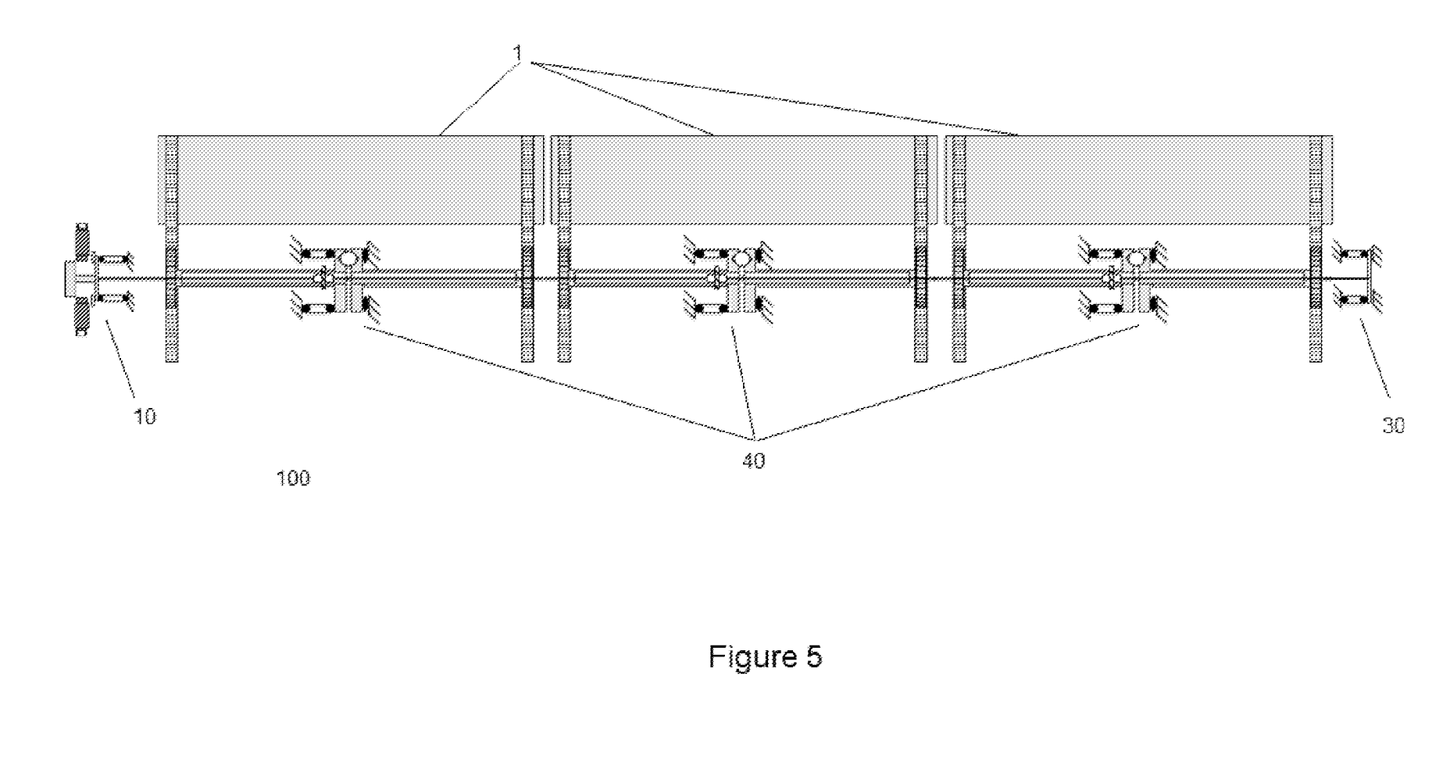
FIG. 5 depicts the skew detection apparatus of FIG. 1 when used with a plurality of control surfaces.

FIG. 5 illustrates the overall Apparatus 100 configured to monitor a plurality of control surfaces 1. Each surface incorporates its own Rotary Differential Shunt Actuator 40 and each of these Actuators interface with a common Tension Cord 20 via a Lost Motion Device 42. The Lost Motion Devices 42 incorporated in each Rotary Differential Shunt Actuator 40 enable any of the Rotary Differential Shunt Actuators 40 incorporated to successfully provide an axial shunt to the Tension Cord 20 and thus allow the abnormal status to be detected by the Skew Sensor Unit 10.

Contrary to known systems for detecting skew of slats on the wing of an aircraft, the apparatus 100 can monitor for skew across an entire control system with a minimum number of sensors. The skew system for the A220 Slat System requires 32 sensors whereas a system based upon this invention would only require 4 sensors; 2 per Skew Sensor Unit per wing, hence offering significant cost and reliability benefits.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A skew sensing apparatus for detecting skew in at least one, or a plurality of control surfaces of a vehicle, the apparatus comprising:
a tension cord which is held under tension between:
a) a first spring associated with a sensor and a sensor target; and
b) an opposing second spring;
wherein during normal operation, said apparatus is configured to maintain said sensor target in a first position relative to said sensor, thereby indicating said normal operation; and
wherein, in an abnormal operation, said apparatus is configured to shunt said tension cord such that said sensor target is translated to a second position, relative to said sensor thereby indicating said abnormal status;
wherein said first spring provides a lower opposing force to said second spring.

2. The apparatus of claim 1 wherein, in said abnormal status, said second spring is configured to axially shunt said tension cord in the direction of said sensor.

3. The apparatus of claim 1, wherein said abnormal status comprises said tension cord being snapped or skewed.

4. The apparatus of claim 1, wherein said apparatus is configured to be attached to said at least one or plurality of control surfaces via a first actuator, provided at a first end and a second actuator, provided at the opposite end.

5. The apparatus of claim 1, further comprising:
a Rotary Differential Shunt Actuator for each of said at a least one or plurality of control surfaces being monitored.

6. The apparatus of claim 5 wherein said Rotary Differential Shunt Actuator comprises:
a spring loaded Ball Ramp Device;
a Lost Axial Motion Device;
a Ball Ramp Preload Spring; and
Two Rotary Inputs Shafts, each connected to two Rotary Pick Offs, each of which communicates with racks at each end of the control surface being monitored.

7. The apparatus of claim 6 wherein, in normal operation, the Rotary Inputs Shafts are configured to rotate in unison, without any differential rotation and the Ball Ramp Device remains in a preloaded condition.

8. The apparatus of claim 6, wherein in an abnormal condition, a differential rotation between the Rotary Input Shafts is configured to activate the Ball Ramp device against the Preload Spring such that said activated Ball Ramp device induces an axial shunt to the tension cord and translates the cord and the sensor target to said second position relative to the sensor.

9. The apparatus of claim 1, wherein said cord is flexible.

10. The apparatus of claim 1, wherein said vehicle is an aircraft.

11. The apparatus of claim 1, wherein said cord extends across a plurality of said control surfaces.

* * * * *